United States Patent
Malaiyandi et al.

(10) Patent No.: US 8,024,518 B1
(45) Date of Patent: Sep. 20, 2011

(54) OPTIMIZING READS FOR VERIFICATION OF A MIRRORED FILE SYSTEM

(75) Inventors: Prasanna Malaiyandi, San Jose, CA (US); Varun Khurana, New Delhi (IN); Michael Federwisch, Sunnyvale, CA (US)

(73) Assignee: Netapp, Inc., Sunnyvale, CA (US)

( * ) Notice: Subject to any disclaimer, the term of this patent is extended or adjusted under 35 U.S.C. 154(b) by 739 days.

(21) Appl. No.: 11/713,786

(22) Filed: Mar. 2, 2007

(51) Int. Cl.
*G06F 12/16* (2006.01)

(52) U.S. Cl. . 711/114; 711/154; 711/162; 711/E12.103; 707/690

(58) Field of Classification Search .................. 711/112, 711/114, 154, 161, 162; 714/6
See application file for complete search history.

(56) References Cited

U.S. PATENT DOCUMENTS

| | | | | |
|---|---|---|---|---|
| 5,212,686 A | * | 5/1993 | Joy et al. ........................ | 370/417 |
| 5,469,560 A | * | 11/1995 | Beglin ........................... | 711/112 |
| 5,644,786 A | * | 7/1997 | Gallagher et al. ............. | 711/112 |
| 5,953,352 A | * | 9/1999 | Meyer .............................. | 714/6 |
| 6,061,732 A | * | 5/2000 | Korst et al. .................... | 711/152 |
| 6,480,970 B1 | * | 11/2002 | DeKoning et al. ............. | 714/6 |
| 6,668,264 B1 | | 12/2003 | Patterson et al. | |
| 6,871,317 B1 | | 3/2005 | Corbett | |
| 6,993,539 B2 | | 1/2006 | Federwisch et al. | |
| 7,007,046 B2 | | 2/2006 | Manley et al. | |
| 7,010,553 B2 | | 3/2006 | Chen et al. | |
| 7,111,147 B1 | | 9/2006 | Strange et al. | |
| 7,143,235 B1 | | 11/2006 | Watanabe et al. | |
| 7,162,486 B2 | | 1/2007 | Patel et al. | |
| 2004/0030668 A1 | | 2/2004 | Pawlowski et al. | |
| 2004/0078519 A1 | | 4/2004 | Bak et al. | |
| 2005/0246382 A1 | | 11/2005 | Edwards | |
| 2005/0278382 A1 | | 12/2005 | LaRocca et al. | |
| 2005/0278383 A1 | | 12/2005 | Kazar et al. | |
| 2005/0283682 A1 | * | 12/2005 | Odawara et al. ................ | 714/42 |

(Continued)

FOREIGN PATENT DOCUMENTS

WO WO 2006086379 A2 * 8/2006

OTHER PUBLICATIONS

"A Case for Redundant Arrays of Inexpensive Disks" by D. Patterson, et al. Comp. Sci. Div., UC Berkeley. Retrieved on Mar. 1, 2007. Retrieved from the internet: http://www.cs.cmu.edu/~garth/RAIDpaper/Patterson88.pdf. Total pp. 8.

(Continued)

*Primary Examiner* — Michael Krofcheck
(74) *Attorney, Agent, or Firm* — Perkins Coie LLP

(57) ABSTRACT

An embodiment of the invention provides an apparatus and method for optimizing reads in a mirrored file system. The apparatus and method receives a plurality of read request blocks for reading the target regions in disks. The apparatus and method will chain the read request blocks in a first set, where all of the read request blocks in the first set are targeted to a first disk. The read request blocks in the first set are then sent as a read request to the first disk. When each read request block in the first set has completed accessing their respective target regions in the first disk, then the read data is generated from the first disk. Therefore, by chaining the read request blocks in a read request to a single disk, read striping is not performed across multiple disks during a read operation.

19 Claims, 4 Drawing Sheets

U.S. PATENT DOCUMENTS

2006/0184587 A1 8/2006 Federwisch et al.
2006/0218210 A1 9/2006 Sarma et al.
2006/0248273 A1 11/2006 Jernigan, IV et al.
2008/0120463 A1* 5/2008 Ashmore .................. 711/114

OTHER PUBLICATIONS

"Storage Networking Building Blocks" by T. Clark. Addison-Wesley. Retrieved on Mar. 1, 2007. Retrieved from the internet: http://www.awprofessional.com/articles/printerfriendly. Total pp. 25.

"RAID-DP™: Network Appliance™ Implementation of RAID Double Parity for Data Protection" by C. Lueth. Network Appliance, Inc. TR-3298 [Dec. 2006]. Total pp. 13.

"SnapMirror® Best Practices Guide" by D. Chapman, et al. Network Appliance, Inc. TR-3446. Apr. 2006. Total pp. 63.

"A Case for Redundant Arrays of Inexpensive Disks" by D. Patterson, et al. Computer Science Division, Dept. of Electrical Eng. & Comp. Science, UC Berkeley. Total pp. 8.

"RAID-DP™: Network Appliance™ Implementation of RAID Double Parity for Data Protection" by C. Lueth, Network Appliance, Inc., TR-3298 Dec. 20, 2006. Total pp. 13.

"SnapMirror® Best Practices Guide" by D. Chapman, et al., Network Appliance, Inc. TR-3446 Apr. 2006. Total pp. 63.

* cited by examiner

OPTIMIZING READS FOR VERIFICATION OF A MIRRORED FILE SYSTEM

TECHNICAL FIELD

Embodiments of the invention relate generally to an apparatus and method for optimizing reads for verification of a mirrored file system.

BACKGROUND

RAID systems (Redundant Array of Independent or Inexpensive Disks systems) permit several inexpensive smaller physical disks to behave as a larger and more expensive physical disk. The use of several smaller physical disks in place of a single larger physical disk is less expensive and also provides a higher degree of protection for the stored data. As known to those skilled in the art, most RAID implementations enhance the reliability and integrity of data storage through the redundant writing of data "stripes" across a given number of physical disks in the RAID disk group, and the appropriate storing of redundant information with respect to the data stripes. The redundant information may be subsequently retrieved to enable recovery of data when one of the disks fails. Striping is the process of storing and/or reading user data across several disks in parallel and in equal-sized blocks of data, and improves the overall performance of the storage subsystems. The term "RAID" and its various implementations are well-known and disclosed in, for example, "A Case for Redundant Arrays of Inexpensive Disks (RAID)", by D. A. Patterson, G. A. Gibson and R. H. Katz, Proceedings of the International Conference on Management of Data (SIGMOD), June 1988.

In order to improve data reliability and/or facilitate disaster recovery of data in the event of a failure of a node, its associated disks, or some portion of the storage infrastructure, it is common to "mirror" (or replicate) some or all of the underlying data and/or the file system that organizes the data in a node. In one example, a mirror is established and stored at a destination volume, so that it is more likely that recovery is possible in the event of a disaster (or other types of failures) that may physically damage the source volume or its infrastructure. A volume is formed by one or more physical storage disks that define an overall logical arrangement of storage space. The disks within a volume are typically organized as one or more disk groups of RAID. The mirror is updated at regular intervals which are typically set by an administrator, in an effort to catch the most recent changes to the file system. In the mirror update process, the data is read from the source volume and written to the destination volume via a network such as, for example, the Internet or other types of network. In other implementations, the source volume and the destination volume are associated with the same network node. One example product that implements the mirroring technology is the SnapMirror® software from NETWORK APPLIANCE, INCORPORATED. It is also noted that the mirroring of volumes between two separate nodes differs from the disk mirroring technique that is used in RAID Level 1 (i.e., "RAID 1"). As known to those skilled in the art, the disk mirroring technique in RAID 1 involves writing data to two disks in a disk group of RAID so that the data can be recovered in the event of a disk failure.

Striping optimizes the writes by writing the data across multiple disks on the destination volume. Data from the source volume is sent to the destination volume in a packet order that is optimized for writing in stripes. A check operation will verify if the data in a destination volume is identical to the data in a source volume. The check operation is performed by currently-available products such as, for example, the SnapMirror® software. When performing a check operation, reads are performed on the destination volume. While striping is optimized for writes, the use of striping is not optimized for reads to disks. The use of striping for reads (i.e., striped reads) slows down the completion of the read operation because reading is required to be completed across all of the multiple disks before the read data are obtained from the multiple disks. In other words, the read data is not obtained from any of the disks until the reads have been completed across all of the multiple disks. Since the read data is not obtained until reading is completed across all of the multiple disks, there is a delay in verifying if the data in the destination volume is identical to the data in the source volume. Therefore, it would be advantageous to increase the speed of the reading operations to the disks in the destination volume, so that the delay can be reduced in verifying if the destination volume data is identical to the source volume data.

SUMMARY OF EMBODIMENTS OF THE INVENTION

An embodiment of the invention provides an apparatus and method for optimizing reads in a mirrored file system. The apparatus and method receives a plurality of read request blocks for reading the target regions in disks. The apparatus and method will chain the read request blocks in a first set, where all of the read request blocks in the first set are targeted to a first disk. The read request blocks in the first set are then sent as a read request to the first disk. After each read request block in the first set has completed accessing their respective target regions in the first disk, then the read data is generated from the first disk. Therefore, by chaining the read request blocks in a read request to a single disk, read striping is not performed across multiple disks during a read operation. As a result, an embodiment of the invention advantageously increases the speed of the reading operations to the disks in a destination volume by not performing the read striping across multiple disks. The chaining of read request blocks permits reads to be performed on a particular disk in the destination volume, and the destination storage system can then start to check the read data from that particular disk, without the need to wait for read access to finish on the other disks in the destination volume disks. Therefore, the reading operations will increase in speed performance and advantageously reduce the delays in verifying if the data in the destination volume is identical to the data in a source volume. The source volume and destination volume can be in different network devices or the same network device. A volume is formed by one or more physical storage disks that define an overall logical arrangement of storage space.

The apparatus and method will also chain the read request blocks in a second set, where all of the read request blocks in the second set are targeted to a second disk. The read request blocks in the second set are then sent as a read request to the second disk. After each read request block in the second set has completed accessing their respective target regions in the second disk, then the read data is generated from the second disk. Other read requests are also sent to any additional disks, where each read request has read request blocks that are chained and that are targeted for a same disk. The read requests to the disks can be transmitted concurrently.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

An embodiment of the invention provides an apparatus and method for optimizing reads in a mirrored file system. The apparatus and method receives a plurality of read request blocks for reading the target regions in disks. The apparatus and method will chain the read request blocks in a first set, where all of the read request blocks in the first set are targeted to a first disk. The read request blocks in the first set are then sent as a read request to the first disk. After each read request block in the first set has completed accessing their respective target regions in the first disk, then the read data is generated from the first disk. Therefore, by chaining the read request blocks in a read request to a single disk, read striping is not performed across multiple disks during a read operation. As a result, an embodiment of the invention advantageously increases the speed of the reading operations to the disks in a destination volume by not performing the read striping across multiple disks. The chaining of read request blocks permits reads to be performed on a particular disk in the destination volume, and the destination storage system can then start to check the read data from that particular disk, without the need to wait for read access to finish on the other disks in the destination volume disks. Therefore, the reading operations will increase in speed performance and advantageously reduce the delays in verifying if the data in the destination volume is identical to the data in a source volume. The source volume and destination volume can be in different network devices or the same network device. A volume is formed by one or more physical storage disks that define an overall logical arrangement of storage space.

Figure 1:
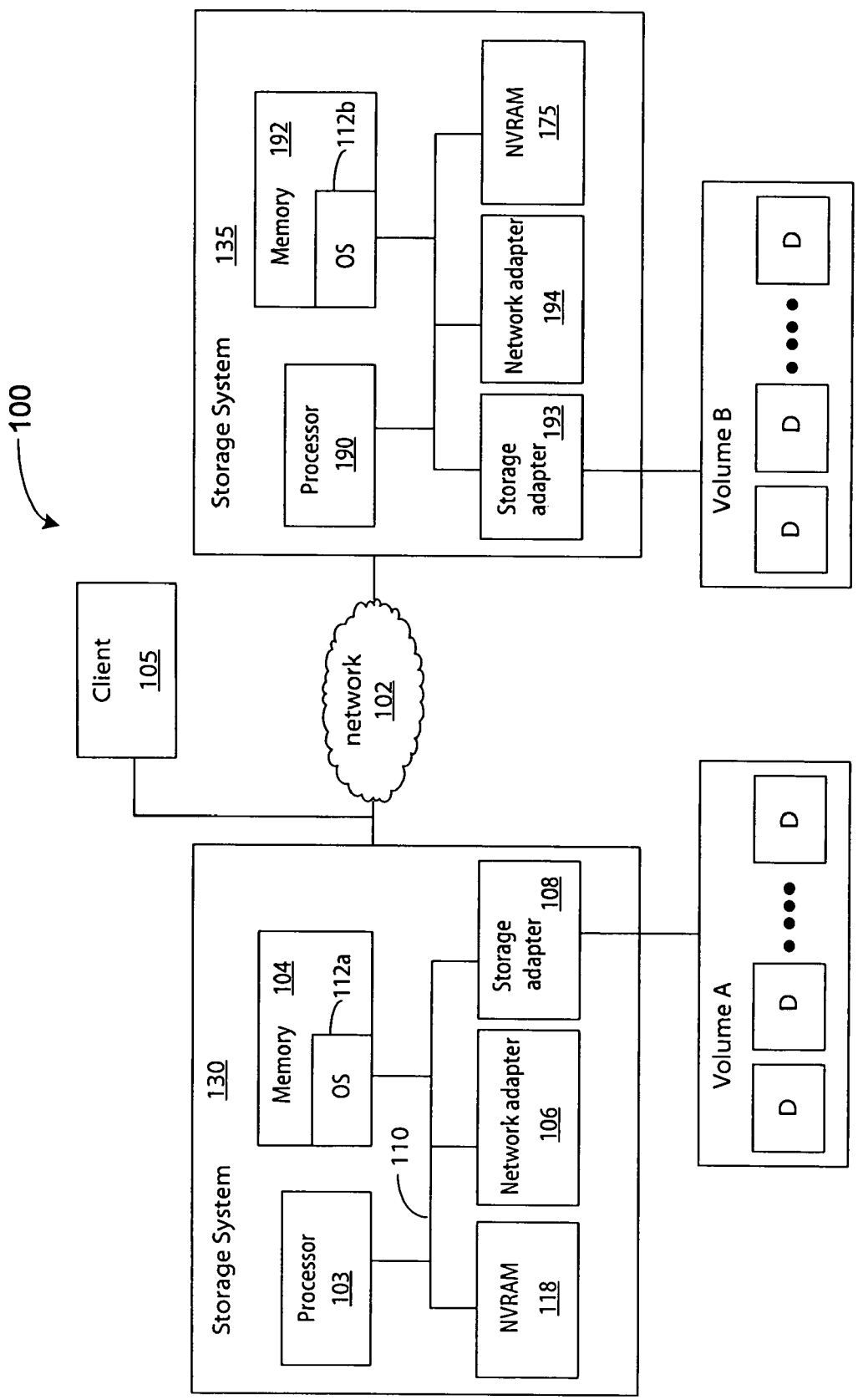
FIG. 1 is a block diagram of a system (apparatus), in accordance with an embodiment of the invention.

FIG. 1 is a block diagram of an apparatus 100, in accordance with an embodiment of the invention. The apparatus 100 includes a network 102 which may be, for example, a local area network (LAN), a wide area network (WAN), virtual private network (VPN), a combination of LAN, WAN and VPM implementations, or another suitable communication network. However, in other embodiments of the invention, a single device may also be used to perform the methods discussed below. For the purposes of this description, the term network should be taken broadly to include any acceptable networking architecture. A client 105 and storage systems (e.g., filers or other types of network devices) 130 and 135 are each, connected to the network 102. Additional clients and storage systems (not shown in FIG. 1) may also be optionally connected to the network 102. Various other devices may also be optionally connected to the network 102 such as, for example, servers, network caches, switches, routers, and/or other suitable devices.

Each of the devices attached to the network 102 typically includes an appropriate conventional network interface arrangement (not shown) for communicating over the network 102 using a desired communication protocol such as, for example, Transport Control Protocol/Internet Protocol (TCP/IP), User Datagram Protocol (UDP), Hypertext Transfer Protocol (HTTP), Simple Network Management Protocol (SNMP), or other suitable protocols.

A storage system is a computer that provides file service relating to the organization or storage of information on storage devices, such as disks. Examples of currently available storage system products and associated software components are commercially available from, for example, NETWORK APPLIANCE, INC., Sunnyvale, Calif. or other vendors. In addition, it will be understood to those skilled in the art that the embodiments of the invention described herein may also apply to any type of special-purpose computer (e.g., server) or general-purpose computer, including a stand-alone computer, embodied as a file server. Moreover, the teachings of the embodiments of the invention can also be adapted to a variety of file server architectures including, but not limited to, a network-attached storage environment, or a storage area network and disk assembly directly-attached to a client/host computer. The term "storage system" or "file server" should therefore be taken broadly to include such arrangements.

The storage system 130 includes a processor 103, a memory 104, a network adapter 106 and a storage adapter 108 interconnected by a system bus 110. The storage system 130 also includes a storage operating system 112a that implements a file system to logically organize the information as a hierarchical structure of directories and files on a disk. Additionally, a persistent storage device 118 such as, for example, a non-volatile RAM (NVRAM) 118 is also typically connected to the system bus 110. Although NVRAMs are shown in FIG. 1, any suitable persistent storage device that retains content in the event of a power failure or other system failure can be used in place of the NVRAMs. An example of a suitable persistent storage device is a battery-backed RAM, although other suitable storage devices may also be used.

In an illustrative embodiment, the memory 104 may have storage locations that are addressable by the processor 103 for storing software program code or data structures for use in the functions of the storage system 130. The processor 103 and adapters 106 and 108 may, in turn, include processing elements and/or logic circuitry configured to execute the software code and manipulate the data structures.

The storage operating system 112a, portions of which are typically resident in memory 104 and executed by the processing elements, functionally organizes a storage system by inter-alia invoking storage operations in support of the file services that are implemented by the storage system. It will be apparent by those skilled in the art that other processing and memory implementations, including various computer readable media may be used for storing and executing program instructions pertaining to the inventive techniques described herein.

The network adapter 106 includes the mechanical, electrical, and signaling circuitry for connecting the storage system 130 to a client 105 over the computer network 102 or connecting the storage system 130 to one or more storage system 135. A client 105 can be a general-purpose computer configured to execute applications including file system protocols such as, for example, the Network File System (NFS) or the Common Internet File System (CIFS) protocol or other suitable protocols. Moreover, the client 105 can interact with the storage system 130 in accordance with the known client/server model of information delivery.

The storage adapter 108 cooperates with the storage operating system 112a in order to access information requested by the client 105. The information may be stored in a number of storage volumes (e.g., Volume A and Volume B). The number of storage volumes may vary. Each storage volume is constructed from an array of physical disks D that are typically organized as RAID disk groups. The RAID disk groups include independent physical disks including those storing a striped data and those storing separate parity data. The number of disks in a storage volume and in a RAID disk group may vary.

The storage adapter 108 includes input/output interface circuitry that couples to the disks over an I/O interconnect arrangement such as, for example, a conventional high-speed/high-performance fibre channel serial link topology. The information is retrieved by the storage adapter 108, and may be processed by the processor 103 (or the adapter 108 itself) prior to being forwarded over the system bus 110 to the network adapter 106, where the information is formatted into a packet and returned to the client 105.

To facilitate access to the disks, the storage operating system 112a typically implements a file system that logically organizes the information as a hierarchical structure of directories in files on the disks. Each file on a disk may be implemented as a set of disk blocks configured to store information such as text or other format. The directory may be implemented as a formatted file in which other files and directories are stored. The storage operating system 112a associated with each volume is, for example, the Data ONTAP® storage operating system which is commercially available from NETWORK APPLIANCE, INC. The Data ONTAP storage operating system implements a Write Anywhere File Layout (WAFL)® file system. However, it is expressly contemplated that the principles of embodiments of this invention can be implemented using a variety of alternate storage operating system architectures. Additional details on the functions of the storage operating system 112a is disclosed in, for example, Additional details on the check operation is disclosed in, for example, commonly-assigned U.S. Pat. No. 6,993,539, by Michael Federwisch et al., entitled "SYSTEM AND METHOD FOR DETERMINING CHANGES IN TWO SNAPSHOTS AND FOR TRANSMITTING CHANGES TO DESTINATION SNAPSHOT", which is hereby fully incorporated herein by reference.

The second storage system 135 also includes the above-described similar components of a processor 190, memory 192, storage operating system 112b, storage adapter 193, network adapter 194, and a persistent storage device 175 such as, for example, an NVRAM.

Figure 2:
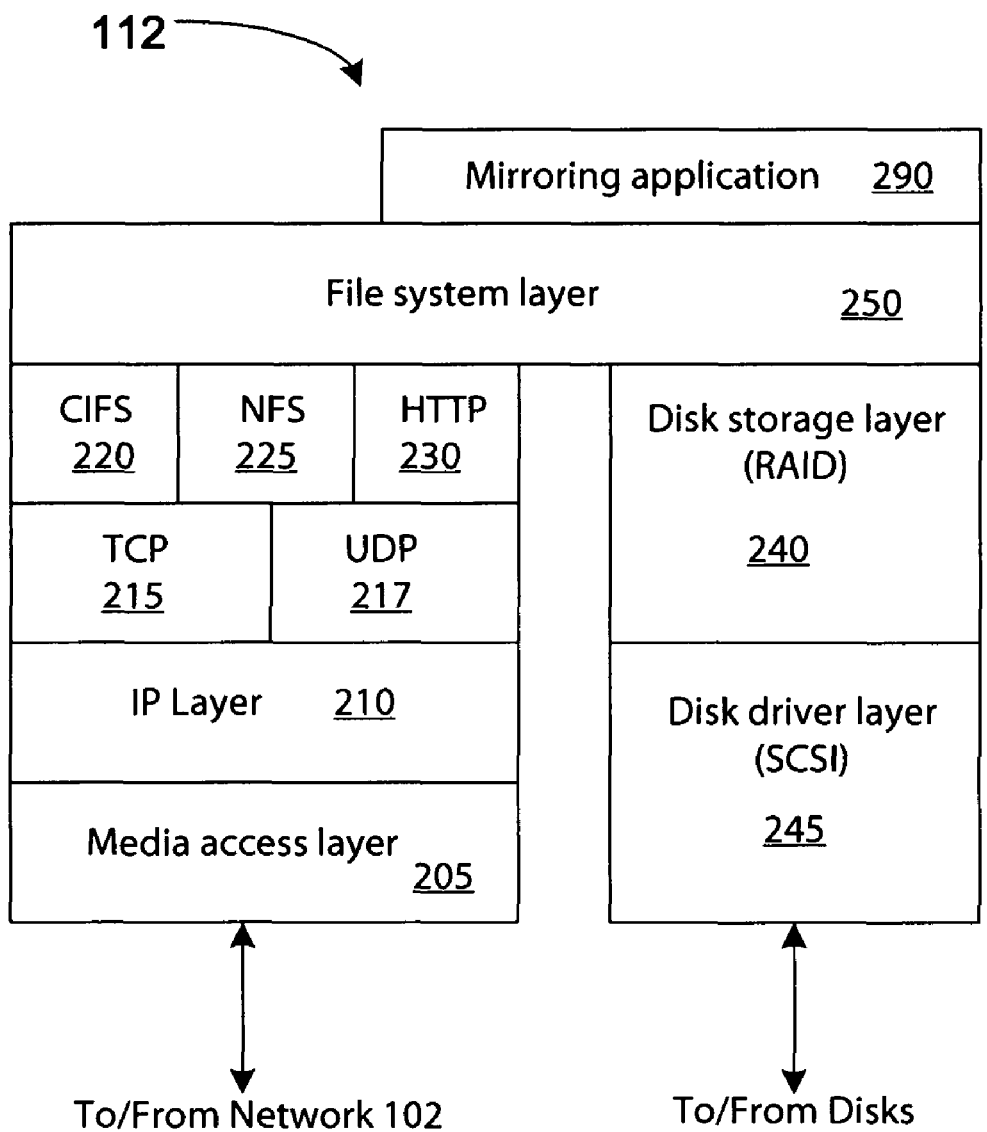
FIG. 2 is a block diagram of an exemplary storage operating system for use with the file servers of FIG. 1, in accordance with an embodiment of the invention.

FIG. 2 is a block diagram of an exemplary storage operating system 112 for use with the file servers 130 and 135 of FIG. 1, in accordance with an embodiment of the invention. Additional details on the functions of the storage operating system 112 are disclosed in, for example, the above-mentioned commonly-assigned U.S. Pat. No. 6,993,539. However, it is expressly contemplated that the principles of embodiments of this invention can be implemented using a variety of alternate storage operating system architectures. The exemplary storage operating system 112 includes various software layers, such as a media access layer 205 of network drivers (e.g., an Ethernet driver). The operating system 112 further includes network protocol layers, such as the Internet Protocol (IP) layer 210. The IP layer 210 includes supporting transport mechanisms, such as the Transport Control Protocol (TCP) layer 215 and the User Datagram Protocol (UDP) layer 217. A file system protocol layer provides multi-protocol data access and, to that end, includes support for the CIFS (Common Internet File System) protocol 220, the NFS (Network File System) protocol 225, and the Hypertext Transfer Protocol (HTTP) protocol 230. In addition, the storage operating system 112 includes a disk storage layer 240 that implements a disk storage protocol, such as a RAID protocol, and a disk driver layer 245 that implements a disk control protocol such as the small computer system interface (SCSI). The protocols discussed above are known to those skilled in the art.

Bridging the disk software layers with the network and file system protocol layers is a file system layer 250 of the storage operating system 112. Generally, the layer 250 implements a file system having an on-disk format representation that is block-based using, e.g., 4-kilobyte (KB) data blocks and using inodes to describe the files. In response to transaction requests, the file system generates operations to load (retrieve) the requested data from volumes if it is not resident "in-core", i.e., in the storage system's memory 104. If the information is not in memory, the file system layer 250 indexes into the inode file using the inode number to access an appropriate entry and retrieve a volume block number. The file system layer 250 then passes the volume block number to the disk storage (RAID) layer 240, which maps that volume block number to a disk block number and sends the latter to an appropriate driver (for example, an encapsulation of SCSI implemented on a fibre channel disk interconnection) of the disk driver layer 245. The disk driver accesses the disk block number from volumes and loads the requested data in memory 104 for processing by the storage system 130. Upon completion of the request, the storage system (and storage operating system) returns a reply, e.g., a conventional acknowledgement packet defined by the CIFS specification, to the client 105 over the respective network 102.

Typically overlying the file system layer 250 is the snapshot mirroring (or replication) application 290. This application 290 is responsible (on the source side) for the scanning and transmission of changes in the snapshot from the source storage system 130 to the destination storage system 135 over the network. A snapshot is an image of the file system in a storage system at a point in time. This application 290 is responsible (on the destination side) for the generation of the updated mirror snapshot from received information. Hence, the particular functions of the source and destination applications 290 are different. Additional details of the snapshot mirroring application 290 are described in, for example, the above-mentioned commonly-assigned U.S. Pat. No. 6,993, 539.

Figure 3:
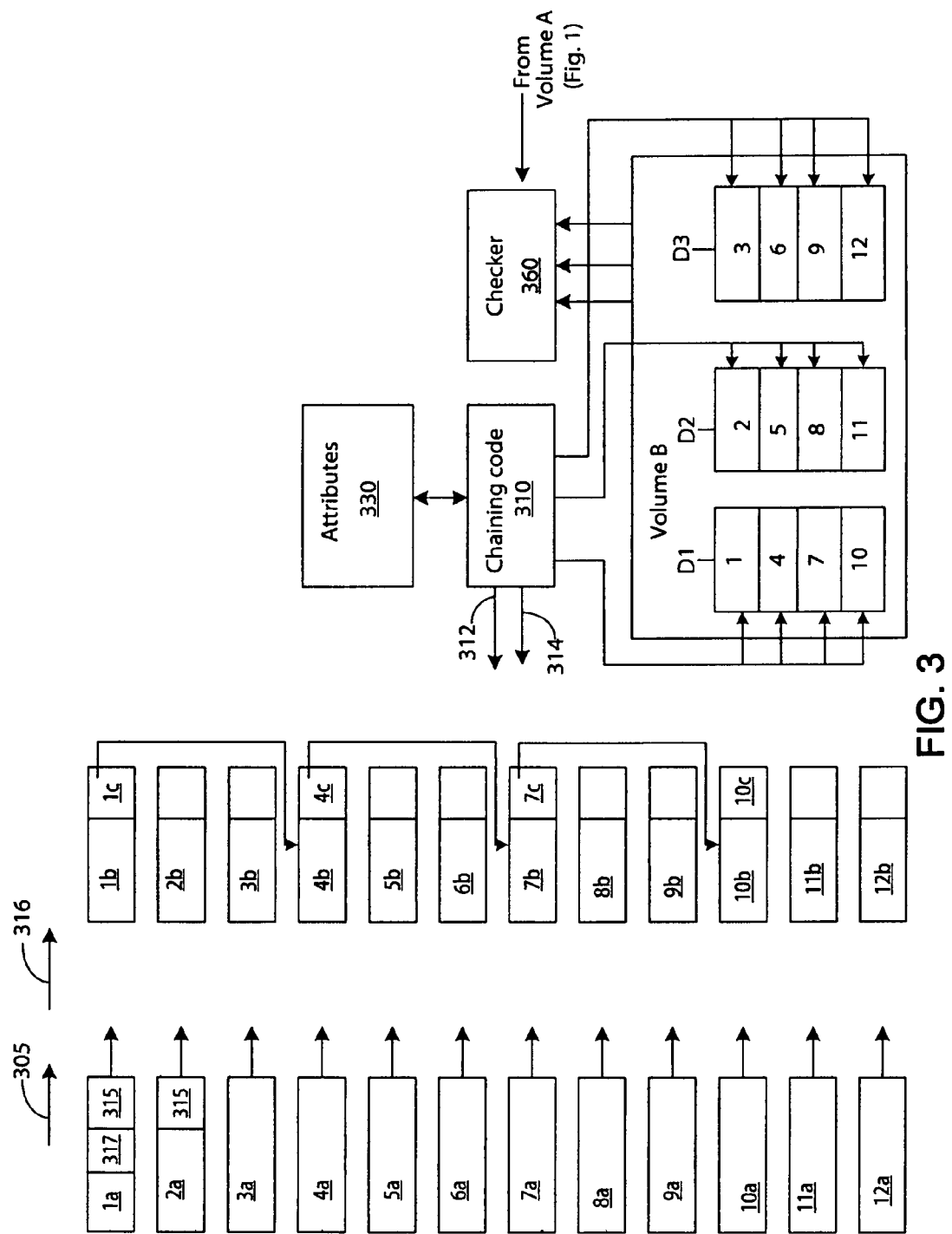
FIG. 3 is a block diagram that shows additional details of an embodiment of the invention.

FIG. 3 is a block diagram that shows additional details of an embodiment of the invention. In the example of FIG. 3, assume that a destination Volume B includes the physical disks D1, D2, and D3. However, the number of physical disks in a volume may vary. Assume further that the destination Volume B is associated with the storage system 135 (FIG. 1) while the source Volume A is in the different storage system 130. However, in other implementations of an embodiment of the invention, the source Volume A and destination Volume B can also be associated with the same computing device.

Assume further that the physical disk D1 has the disk regions (1,4,7,10), while the disk D2 has the disk regions (2,5,8,11), and the disk D3 has the disk regions (3,6,9,1). Each disk region may be at any suitable size and may contain any suitable number of data blocks. Each disk region may contain a single data block or multiple data blocks. Each data block may have a size of, for example, 4 kilobytes. In one example implementation, each disk region contains 64 data blocks, although the number of data blocks in a disk region may vary. The attributes 320 indicates which of the disk regions are in each disk D1-D3.

The below discussed method provides an optimized reading of disks so that a user can determine if the data in the disks in the destination volume B are identical (mirrored) to the data in the source volume A. The destination volume B and source volume A will form a synchronized data system or mirrored file system, if updates are performed for the data in the destination volume B so that the data in the destination volume B can remain identical to the data in the source volume A. Therefore, any changes that occur in the data in the source volume A will also be made in the data in the destination volume A. Various methods are known to those skilled in the art for updating data in volumes so that data in a source volume and destination volume remains synchronized or identical.

The destination storage system 135 (FIG. 1) receives read requests 305 from the source storage system 130 to determine if data in the destination volume B is identical to the data in the source volume A (FIG. 1). As mentioned above, the source volume A and destination volume B can be in the same computing device (e.g., storage system) or in different computing devices. The data in the destination volume B is compared to the data in the source volume A during, for example, a check operation 316 which is also described in commonly-assigned U.S. patent application Ser. No. 11/478,931, by Varun Khurana and Prasanna K. Malaiyandi, filed 30 Jun. 2006, which is hereby fully incorporated herein by reference. The operating system 112b of the destination storage system 135 detects a check operation 316 by a negotiation process between the source storage system 130 and destination storage system 135. After the operating system 112b of the destination storage system 135 and the operating system 112a in the source storage system 130 have completed the negotiation process for the check operation, the operating system 112b of the destination storage system 135 can then process the read requests 305 from the operating system 112a of the source storage system 130, as also described in the above-cited U.S. patent application Ser. No. 11/478,931.

The destination storage system 135 receives the read request 305 as example read request blocks 1a, 2a, 3a, 4a, 5a, 6a, 7a, 8a, 9a, 10a, 11a, and 12a. A process in the disk storage layer 240 (FIG. 2) will stripe a request received from a network into the striped blocks 1a to 12a by use of standard RAID striping methods. Therefore, the destination storage system 135 receives the blocks 1a to 12a in successive order in accordance with RAID striping. Note that a read request block (e.g., block 1a) may actually be formed by multiple request blocks that will target respective data blocks in a disk region (e.g., region 1 in disk D1). For purposes of clarity in discussing an embodiment of the invention, it is assumed in the below example that a read request block (e.g., block 1a) is a single request block that will target a single data block in a disk region (e.g., region 1 in disk D1).

Note that for standard writes to disks by use of the RAID striping method, a write request would also be received by the destination storage system 135 in the same successive order of request blocks 1a to 12a. In a write operation, a process of the disk storage layer 240 (FIG. 2) will then send the request blocks (1a,2a,3a) to the target regions (1,2,3), respectively, in accordance with RAID stripe writes. The blocks (4a,5a,6a) are then sent to the target regions (4,5,6), respectively. The blocks (7a,8a,9a) are then sent to the target regions (7,8,9), respectively. Subsequently, the blocks (10a,11a,12a) are then sent to the target regions (10,11,12), respectively. Therefore, a RAID striping write operation will write across each of the disks D1-D3, and provides an increased data throughput for writes.

In an embodiment of the invention, a process 312 of the chaining code 310 detects the arrival of read request blocks 1a to 12a. The chaining method that is performed by a process 314 of the chaining code 310 will be described further below. The process 312 determines that the read request blocks 1a to 12a are read requests by use of various suitable methods. For example, the operating system 112b (FIG. 1) of the destination storage system 135 detects a check operation 316 which is sent from the source storage system 130. The source storage system 130 and destination storage system 135 performs a check operation negotiation procedure before the check operation 316 is transmitted from the source storage system 130 to the destination storage system 135. The process 312 of the chaining code 312 then detects the arrival of the check operation 315. The process 312 then detects the arrival of the read request blocks 1a to 12a which are data transmissions that follow the arrival of the check operation 316. Additional details of the check operation 316 are disclosed in, for example, the above-mentioned commonly-assigned U.S. patent application Ser. No. 11/478,931. The check operation 316 is also a feature that is provided in, for example, the Data ONTAP® storage operating system (versions 7.1 and 7.2) which are commercially available from NETWORK APPLIANCE, INC.

In other embodiments of the invention where the check operation 316 is not used, the process 312 of the chaining code 310 can detect the read request blocks 1a-12a by reading a read request identifier 317 in the headers of the read request blocks 1a-12a. Various methods are well known to those skilled in the art for identifying the data block request types by reading the header information in the requests.

The read request blocks 1a to 12a are targeted for reading the disk regions 1 to 12, respectively, so that an administrator can determine if the data in Volume B (FIG. 3) is identical to the data in Volume A (FIG. 1). Typically, the chaining code 310 can be implemented with the operating system 112 (FIG. 2). In accordance with an embodiment of the invention, the process 312 of the chaining code 310 reads the headers 315 of the read request blocks 1a to 12a to determine the respective target disk regions of each of the read request blocks 1a to 12a. The process 312 of the chaining code 310 also checks the attributes 320 to determine which disk regions are located in each of the disks D1-D3. The process 312 of the chaining code 310 also buffers the read request blocks 1a to 12a to the buffers 1b to 12b, respectively. The process 312 can buffer the read request blocks 1a to 12a in the buffers 1b to 12b in a concurrent manner, in any successive order, or in other suitable manners. Alternatively, the buffers 1b to 12b may instead be embodied as memory areas.

In accordance with an embodiment of the invention, a process 314 of the chaining code 310 will chain the read request blocks that are targeted to disk regions in the same disk, as discussed below. As an example, the process 314 will chain together the read request blocks (1a,4a,7a,10a) because this first set of read request blocks are targeted to the regions (1,4,7,10,) respectively, in the same disk D1. The read request blocks (2a,5a,8a,11a) are also chained together because this second set of read request blocks are targeted to regions (2,5,8,11) in disk D2. The read request blocks (3a,6a, 9a,12a) are chained together because this third set of read request blocks are targeted to regions (3,6,9,12) in disk D3.

Memory pointers in the buffers are used to chain any of the read request blocks 1a to 12a, as discussed below. For example, the memory pointer 1c in buffer 1b (which buffers the read request block 1a) will point to the buffer 4b (which buffers the read request block 4a). The pointer 1c contains a variable that indicates the location or address of the buffer 4b. Various types of memory pointers are known to those skilled in the art. The pointer 4c in buffer 4b (which buffers the read request block 4a) will point to the buffer 7b (which buffers the read request block 7a). The pointer 7c in buffer 7b (which buffers the read request block 7a) will point to the buffer 10b (which buffers the read request block 10a). The process 312 of the chaining code 310 places the blocks (1a,4a,7a,10a) in the buffers (1b,4b,7b,10b), respectively. The memory pointers are used to link the buffers (1b,4b,7b,10b). The process 314 of the chaining code 310 then chains the blocks (1a,4a, 7a,10a) by reading these blocks from the linked buffers (1b, 4b,7b,10b) and by then packaging these blocks (1a,4a,7a, 10a) into a read request 325. The process 314 then sends the request 325 to read from the disk D1. The read request blocks (1a,4a,7a,10a) of request 325 will access their target regions (1,4,7,10), respectively, by use of any suitable standard disk read access methods.

Similarly, the process 314 chains together the blocks (2a, 5a,8a,11a) and chains together the blocks (3a,6a,9a,12a), by use of the method discussed above. The process 314 sends the chained read request blocks (2a,5a,8a,11a) as a read request 330 to the regions (2,5,8,11), respectively, of disk D2, and sends the chained read request blocks (3a,6a,9a,12a) as a read request 335 to the regions (3,6,9,12), respectively, of disk D3. Note that the process 314 can send the requests 325, 330, and 335 to the disks, concurrently.

This chaining of the read request blocks is optimized for reads because each read request that is sent to the RAID disks D1-D3 is only targeted at one disk. When the read request blocks (1a,4a,7a,10a) of request 325 have finished reading the disk regions (1,4,7,10), respectively, in disk D1, then the checker 360 or other suitable types of data comparison code can compare the read data 340 from disk D1 with respect to a corresponding data 365 from the source volume A (FIG. 1). For example, the checker 360 or other suitable types of data comparison code can compare the data blocks or checksums of data in the disks in the destination volume B and source volume A. As a result, a user can determine if the destination volume B is a mirror of the source volume A. A suitable checker 360 is discussed further in, for example, the above-cited commonly-assigned U.S. patent application Ser. No. 11/478,931. The read data 345 and 350 from disks D2 and D3, respectively, are also compared with corresponding data from volume A, by the checker 360 or other suitable types of data comparison code.

The chaining of read request blocks permits reads to be performed on a disk (e.g., disk D1) and to send the read data 340 to the checker 360, without the need to wait for read access to finish on the disks D2 and D3. In contrast, in current systems, data updates (writes) and reads are performed as stripes of data that are written or read across each of the disks D1, D2, D3. The write request blocks or read request blocks would first access the regions (1,2,3) of disks D1 to D3, respectively, then access the regions (4,5,6), then access the regions (7,8,9), and then access the regions (10,11,12) in accordance with striping. Since the disk access is performed across the RAID disks D1-D3, in the prior methods, a read data 340 would not be immediately sent from the disk D1 to the checker 360 until accesses to the disks D2 and D3 and read operations to the disks D2 and D3 have also been completed. As a result, the checker 360 is delayed in performing the data comparison between volumes A and B. Since a check operation requires many reads, the performance impact of performing stripe reads can be noticeable. Therefore, an embodiment of the invention will optimize the reads to the disks by avoiding the use of stripe reads.

An embodiment of the invention optimizes read performance on a mirror file system for a check operation without requiring any software or configuration changes on the source side (e.g., source storage system 130). The data which is sent to the destination side (e.g., destination storage system 135) is optimized for writes by use of RAID striping. As discussed above, the data stripes are re-organized into chains to improve efficiency in reading on the destination side. Therefore, read performance is also optimized on the destination side (destination mirror or storage system 135). Additionally, the format of the data that is transmitted over the network 102 does not require any changes to improve data throughput during read operations. These network-transmitted data is chained on the destination side, as discussed above, to improve the data throughput during read operations. As a result, an embodiment of the invention advantageously increases the speed of the reading operations to the disks in a destination volume by not performing the read striping across multiple disks. The chaining of read request blocks permits reads to be performed on a particular disk in the destination volume, and the destination storage system can then start to check the read data from that particular disk, without the need to wait for read access to finish on the other disks in the destination volume disks. Therefore, the reading operations will increase in speed performance and advantageously reduce the delays in verifying if the data in the destination volume is identical to the data in a source volume.

Figure 4:
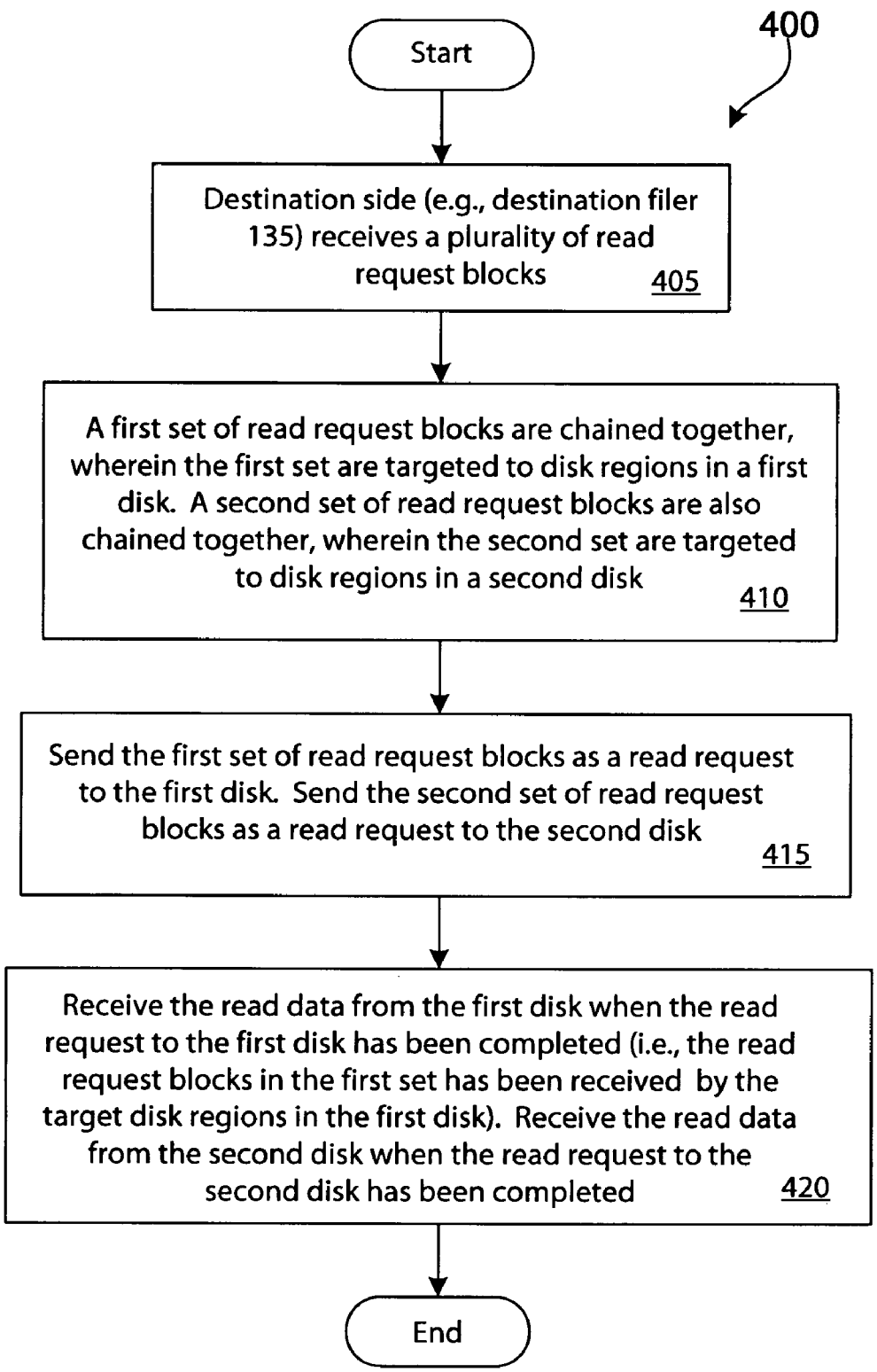
FIG. 4 is a flow diagram of a method for optimizing reads in a mirrored file system, in accordance with an embodiment of the invention.

FIG. 4 is a flow diagram of a method 400 for optimizing reads in a mirrored file system, in accordance with an embodiment of the invention. In block 405, the destination side (e.g., destination storage system 135) receives a plurality of read request blocks.

In block 410, a first set of read request blocks are chained together, wherein the first set are targeted to disk regions in a first disk. A second set of read request blocks are also chained together, wherein the second set are targeted to a second disk. Other read request blocks that are targeted to any another disk, if any, are also chained together. As discussed above, the read request blocks are chained by buffering the blocks into linked buffers, and reading the blocks from the linked buffers, and then packaging the blocks from the linked buffers as a request to one disk.

In block 415, the first set of read request blocks are sent as a read request to the first disk. The second set of read request blocks are sent as a read request to the second disk. The read requests may be sent to the disks, concurrently.

In block 420, a checker 360 (FIG. 3) receives the read data from the first disk when the read request to the first disk has been completed (i.e., the read request blocks in the first set has been received by the target disk regions in the first disk). The checker 360 also receives the read data from the second disk when the read request to the second disk has been completed.

It is also within the scope of an embodiment of the present invention to implement a program or code that can be stored in a machine-readable medium to permit a computer to perform any of the methods described above.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
receiving, at a mirroring destination storage controller, a plurality of blocks from a mirroring source host as part of a read request associated with an operation to verify mirrored data striped across a plurality of physical storage devices associated with the mirroring destination storage controller, wherein the received plurality of blocks are ordered according to a redundancy striping scheme implemented on the mirroring source host;
generating, at the mirroring destination storage controller, a plurality of sets of storage device-specific requests corresponding to the received plurality of blocks, to read the data striped across the plurality of physical storage devices, by chaining a portion of the plurality of blocks, each set of the plurality of sets of storage device-specific requests including at least one storage device-specific read request to read at least one block that corresponds to a block in the received plurality of blocks;
sending each set of the plurality of sets of storage device-specific requests to a physical storage device of the plurality of physical storage devices that corresponds to the storage device of the at least one storage device-specific read request, to cause the plurality of physical storage devices to return data; and
retrieving, at the mirroring destination storage controller, the returned data from each of the plurality of physical storage devices independently and substantially concurrently, including sending data read from one of the physical storage devices responsive to one of the storage device-specific requests to a checker, for comparison against one or more blocks in the received plurality of blocks, before at least one other storage device-specific request of the plurality of storage device-specific requests has completed.

2. The method of claim 1, further comprising:
verifying device-specific data retrieved from a first one of the plurality of physical storage devices against the received plurality of blocks independently and substantially concurrently with device-specific data retrieved from a second one of the plurality of physical storage devices.

3. The method of claim 1, wherein the at least one storage device-specific read request is targeted to a particular storage device of the plurality of physical storage devices based on a block reference in a corresponding block of the plurality of blocks, each block reference corresponding to a particular physical storage device of the plurality of physical storage devices.

4. The method of claim 1, wherein the plurality of blocks are organized as a data stripe in accordance with a RAID striping arrangement for mirroring striped data from the host.

5. The method of claim 1, wherein each block of the plurality of blocks further includes source data replicated from the host and a checksum of the source data.

6. The method of claim 1, wherein at least one storage device-specific read request of a first set of the plurality of storage device-specific requests is chained to one other storage device-specific read request of the first set by a memory pointer.

7. A mirroring destination storage system comprising:
a communication interface through which to receive a read request and a corresponding stream of blocks associated with an operation to verify data striped across a plurality of physical storage devices associated with the mirroring destination storage system, the stream of blocks organized according to a redundancy striping scheme implemented on a mirroring source host;
a processor; and
a chaining code module, communicatively coupled to the communication interface and the processor, configured to retrieve the data to the storage system by generating, based on the read request, a plurality of sets of storage device-specific read requests corresponding to the stream of blocks, to cause each of the plurality of physical storage devices to return requested data independently and substantially concurrently, each set of the plurality of sets of storage device-specific read requests including at least one storage device-specific read request to read at least one block that corresponds to a block in the stream of blocks, the chaining code module further configured to send data read from one of the physical storage devices in response to one of the storage device-specific requests to a checker module, for comparison against one or more blocks in the stream of blocks, before at least one other storage device-specific request of the plurality of storage device-specific requests has completed.

8. The mirroring destination storage system of claim 7, further comprising:
the checker module, communicatively coupled to the storage system, configured to verify the storage device-specific data retrieved from a first one of the plurality of physical storage devices with a set of source data independently and substantially concurrently with storage device-specific data retrieved from a second one of the plurality of physical storage devices.

9. The mirroring destination storage system of claim 7, wherein the storage device-specific read requests are chained based on a block reference associated with a corresponding block of the stream of blocks, each block reference corresponding to a particular physical storage device of the plurality of physical storage devices.

10. The mirroring destination storage system of claim 9, wherein the storage device-specific read requests are chained in a buffer.

11. The mirroring destination storage system of claim 9, wherein the storage device-specific read requests are chained by memory pointers.

12. The mirroring destination storage system of claim 7, wherein the read request is:
organized in accordance with a RAID striping arrangement to mirror striped data from a host to the storage controller, and associated with an operation to verify, at the storage controller, data striped from the host according to the RAID striping arrangement.

13. The mirroring destination storage system of claim 7, wherein each block of the stream of blocks further includes source data replicated from the host and a checksum of the source data.

14. A method comprising:
receiving, at a mirroring destination storage controller, a stream of blocks as part of a read request associated with an operation to verify mirrored data striped across a plurality of physical storage devices associated with the mirroring destination storage controller, each block of the stream including a block reference, the blocks of the stream organized in successive order in accordance with a RAID striping scheme implemented on a mirroring source host;
generating, by chaining a portion of the block references of the stream, a plurality of storage device-specific read requests, corresponding to the received plurality of blocks, for data striped across the plurality of physical storage devices;
retrieving the data to the mirroring destination storage controller by issuing the plurality of storage device-specific read requests to cause each of the plurality of physical storage devices to return requested data corresponding to the stream of blocks independently and substantially concurrently with each other;
sending storage device-specific data retrieved from a first one of the plurality of physical storage devices responsive to one of the storage device-specific read requests to a checker, for comparison against one or more blocks in the received stream of blocks, before at least one other storage device-specific request of the plurality of storage device-specific requests has completed; and
verifying, by the checker, the storage device-specific data retrieved from the first one of the plurality of physical storage devices responsive to one of the storage device-specific read requests, against the one or more blocks in the received stream of blocks, before at least one other of the storage device-specific requests has completed.

15. The apparatus of claim 14, wherein the stream of blocks is:
organized according to a RAID striping arrangement to mirror striped data from a host to the storage controller, and
associated with an operation to verify, at the storage controller, data striped from the host according to the RAID striping arrangement.

16. The apparatus of claim 14, wherein each block of the stream of blocks further includes source data replicated from the host and a checksum of the source data.

17. The apparatus of claim 14, wherein the plurality of storage device-specific requests are chained together by memory pointers.

18. The apparatus of claim 14, wherein storage device-specific read requests of the plurality associated with a block reference corresponding to a same physical storage device are chained.

19. The apparatus of claim 18, wherein the plurality of storage device-specific requests are chained together in a buffer.

* * * * *